United States Patent
Oncale (10) Patent No.: US 9,863,396 B2
(45) Date of Patent: Jan. 9, 2018

(54) SYSTEMS AND METHODS FOR GENERATING ENERGY

(71) Applicant: Gary Joseph Oncale, Humble, TX (US)

(72) Inventor: Gary Joseph Oncale, Humble, TX (US)

( * ) Notice: Subject to any disclaimer, the term of this patent is extended or adjusted under 35 U.S.C. 154(b) by 451 days.

(21) Appl. No.: 14/685,674

(22) Filed: Apr. 14, 2015

(65) Prior Publication Data

US 2016/0305396 A1  Oct. 20, 2016
US 2017/0328340 A9  Nov. 16, 2017

Related U.S. Application Data

(60) Provisional application No. 62/012,671, filed on Jun. 16, 2014.

(51) Int. Cl.
| | |
|---|---|
| F03B 3/04 | (2006.01) |
| F03B 11/00 | (2006.01) |
| F03B 15/06 | (2006.01) |
| F03B 13/00 | (2006.01) |

(52) U.S. Cl.
CPC ............. *F03B 15/06* (2013.01); *F03B 3/04* (2013.01); *F03B 11/004* (2013.01); *F03B 13/00* (2013.01); *F05B 2220/20* (2013.01); *F05B 2220/602* (2013.01); *Y02B 10/50* (2013.01); *Y02E 10/223* (2013.01); *Y02E 10/226* (2013.01)

(58) Field of Classification Search
CPC .......... F03B 3/04; F03B 11/004; F03B 15/06; F03B 13/00; F05B 2220/20; F05B 2220/602; Y02E 10/223; Y02E 10/226; Y02B 10/50
See application file for complete search history.

(56) References Cited

U.S. PATENT DOCUMENTS

| | | | | |
|---|---|---|---|---|
| 716,650 | A * | 12/1902 | Wheeler et al. | F04D 19/00 415/122.1 |
| 1,946,182 | A * | 2/1934 | Thompson | F02C 1/02 415/145 |
| 2,436,683 | A * | 2/1948 | Wood, Jr. | H02K 5/128 290/43 |
| 3,750,001 | A * | 7/1973 | McCloskey | A01G 25/16 290/43 |
| 4,352,025 | A * | 9/1982 | Troyen | F03B 13/00 290/54 |
| 4,496,845 | A * | 1/1985 | Ensign | F03B 15/12 290/43 |
| 6,765,308 | B1 * | 7/2004 | Kazanjian | F03B 13/00 290/43 |
| 7,802,942 | B2 * | 9/2010 | Cripps | E03F 3/00 290/1 R |
| 8,067,850 | B2 * | 11/2011 | Alvarez | B82Y 15/00 290/54 |
| 8,092,675 | B2 * | 1/2012 | Kennedy | C02F 1/4674 204/194 |
| 8,193,652 | B2 * | 6/2012 | Paoli | F03B 3/103 290/43 |
| 8,946,921 | B2 * | 2/2015 | Kaiser | H02K 7/1823 290/43 |

* cited by examiner

*Primary Examiner* — Igor Kershteyn
(74) *Attorney, Agent, or Firm* — Pierson IP, PLLC (57) ABSTRACT

Examples of the present disclosure are related to systems and methods for utilizing effluent pipeline to generate energy. More particularly, embodiments disclose positioning a turbine within a bypass pipeline, wherein the bypass pipeline has a greater diameter than the effluent pipeline.

20 Claims, 6 Drawing Sheets

SYSTEMS AND METHODS FOR GENERATING ENERGY

CROSS-REFERENCE TO RELATED APPLICATIONS

This application claims a benefit of priority under 35 U.S.C. §119 to Provisional Application No. 62/012,671 filed on Jun. 16, 2014, which is fully incorporated herein by reference in its entirety.

BACKGROUND INFORMATION

Field of the Disclosure

Examples of the present disclosure are related to systems and methods for utilizing effluent pipelines to generate energy. More particularly, embodiments disclose diverting a fluid flow from an effluent pipeline to a bypass pipeline, wherein the bypass pipeline has a greater diameter than the effluent pipeline.

Background

Hydropower is a term that refers to the production of power via fluid flow through an effluent pipeline. Conventionally, to generate power from the flowing fluid, a turbine is positioned in the effluent pipeline to contact the flowing fluid. Blades of the turbine are rotated responsive to the flowing fluid to generate torque. Responsive to the turbine generating torque, energy associated with the flowing water may be converted into another form of energy, such as electrical energy.

In conventional hydropower systems, the greater the torque created by the turbine, the greater amount of horsepower the turbine will generate. However, the torque of the turbine is limited to the speed of the flowing fluid and the diameter of the turbine's blades. Yet, the diameter of a conventional turbine may not be greater than the diameter of the effluent pipeline.

Accordingly, needs exist for more effective and efficient systems and methods to increase the torque generated by a turbine by increasing the diameter of the blades of the turbine.

SUMMARY

Embodiments described herein disclose a bypass pipeline coupled to an effluent pipeline to generate energy, wherein the bypass pipeline has a greater diameter than the effluent pipeline.

In embodiments, a turbine may be positioned within the bypass pipeline, wherein the blades of the turbine may have a greater diameter than would be possible if the turbine was positioned in the effluent pipeline. Utilizing a turbine with larger sized blades may lead to the turbine generating more torque, which may be converted into electrical energy. Therefore, by increasing the blades of the turbine, the turbine may create a maximum torque to generate a maximum wattage.

In embodiments, a bypass control valve may be positioned at a divergent point in the effluent pipeline to control the flow of fluid through the effluent pipeline and the bypass pipeline. The bypass control valve may be configured to control the flow of fluid through the effluent pipeline and the bypass pipeline. By controlling the flow of fluid through the effluent pipeline and the bypass pipeline, the pipeline system may continuously generate power. In embodiments, while the pipeline system has a surplus of fluid, fluid may be directed through both the effluent pipeline and the bypass pipeline. Even in embodiments where fluid through the pipeline system is limited, the bypass control valve may direct more fluid to flow through the bypass pipeline.

Embodiments disclosed herein may not use fluids additional to the fluid already flowing through the effluent pipeline. Therefore, embodiments may not require an additional fluid source to operate. Embodiments may thus be a commercially viable hydro-driven electric generation system. Other systems that have been developed are ineffective and inefficient due to the sizing limitations of the turbine. As such, conventional systems do not have the ability to produce enough electricity to warrant their expense.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Embodiments disclosed herein describe a pipeline system that is configured to direct a flow of fluid through a bypass pipeline to increase an amount of torque generated by a turbine. By increasing the amount of torque generated by the turbine, the horsepower and energy created by the turbine may correspondingly increase.

Figure 1:
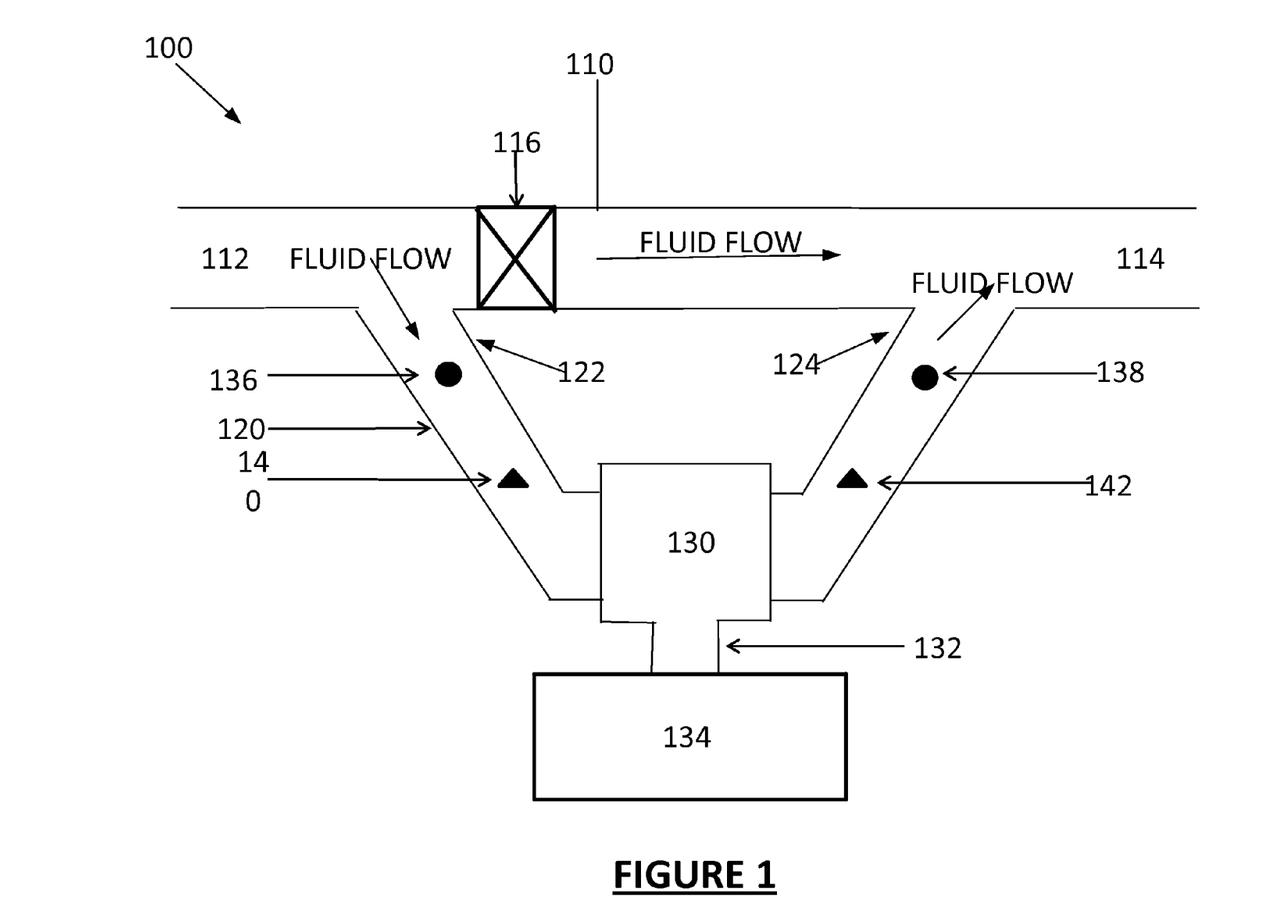
FIG. 1 depicts one embodiment of a topology for an effluent to energy system.

FIG. 1 depicts one embodiment of a topology for an effluent to energy system 100. Effluent to energy system 100 may include effluent pipeline 110 and bypass pipeline 120.

Effluent pipeline 110 may be a standard pipeline within an effluent discharge system, wherein effluent pipeline 110 is configured to transport fluid through effluent pipeline 110. Effluent pipeline 110 may be comprised of varying materials and may be different shapes, wherein effluent pipeline 110 may have a first diameter.

A first side 112 of effluent to energy system 100 may be coupled to effluent pipeline 110. First side 112 may be an inlet port configured to receive fluid from a source, such as a waste management system. A second side 114 of effluent to energy system 100 may be coupled to effluent pipeline 110, wherein second side 114 may be an outlet port configured to discharge the fluid.

Effluent pipeline 110 may include a bypass control valve 116. Bypass control valve 116 may be a device configured to control the flow rate of fluid through effluent pipeline 110 and/or bypass pipeline 120. Additionally, bypass control valve 116 may divert fluid that conventionally flows through effluent pipeline 110 to flow through bypass pipeline 120. Bypass control valve 116 may be a squeeze valve or any other device that regulates, directs, and/or controls the flow of a fluid by opening, closing, or partially obstructing various passageways. Responsive to bypass control valve 116 being opened, the amount of fluid flowing through effluent pipeline 110 may be increased, while reducing the amount of fluid that may flow through bypass pipeline 120. Responsive to bypass control valve 116 being closed, the amount of fluid flowing through effluent pipeline 110 may be reduced, while increasing the amount of fluid flowing through bypass pipeline 120. In embodiments, bypass control valve 116 may control the flow rate of fluid flowing through bypass pipeline 120. When bypass control valve 116 controls the flow of fluid, a differential pressure between a first side 122 of turbine 130 and a second side 124 of turbine 130 may remain substantially constant.

Bypass pipeline 120 may be a pipeline that is configured to transport liquid from the first side 112 to the second side 114 of effluent to energy system 100. Bypass pipeline 120 may be comprised of varying materials and may be different shapes, wherein bypass pipeline 120 may have a second diameter. The first diameter associated with the effluent pipeline 110 may be less than a diameter of at least a portion of the second diameter of bypass pipeline 120.

Bypass pipeline 120 may be a pipeline that provides an alternative route for fluids to flow from first side 112 of effluent to energy system 100 to second side 114 of effluent to energy system 100. In embodiments, if fluids flow through bypass pipeline 120, then that fluid may not flow through effluent pipeline 110.

A first side 122 of bypass pipeline 120 may be coupled to first side 112 of effluent pipeline 110, wherein the first side 112 of effluent pipeline 110 may be positioned before fluid may flow through bypass control valve 116. A second side 124 of bypass pipeline 120 may be coupled to second side 114 of effluent pipeline 110, wherein the second side 114 of effluent pipeline may be positioned after a location where fluid flowed through bypass control valve 116 or through bypass pipeline 120.

Bypass pipeline 120 may include turbine 130, drive shaft 132, generator 134, first flow measurement device 136, second flow measurement device 138, first differential pressure measurement device 140, and second differential pressure measurement device 142.

Turbine 130 may be a mechanical device that is configured to generate energy responsive to fluid flowing through turbine 130. Additionally, turbine 130 may be configured to generate energy based on the pressure differential between first side 122 and second side 124 of bypass pipeline 120. Turbine 130 may include a plurality of blades, paddles, projections, etc. (referred to hereinafter collectively and individually as "blades"), wherein the blades may project outward from a body of the turbine 130 towards a perimeter, boundary, housing, etc. of bypass pipeline 120. Thus, the diameter extending across the two of the plurality of blades may correspond to the second diameter associated with bypass pipeline 120, wherein the diameter extending across the two blades may be greater than the first diameter associated with effluent pipeline 110.

Drive shaft 132 may be mechanically coupled to turbine 130 and generator 134. Drive shaft 132 may be configured to transmit torque generated by turbine 130 to generator 134. Drive shaft 132 may be configured to move, rotate, etc. responsive to turbine 130 rotating.

Generator 134 may be a device configured to convert mechanical energy into electrical energy. Generator 134 may be configured to receive mechanical energy in the form of torque from drive shaft 132, and convert the torque into electrical energy. One skilled in the art will appreciate that on other embodiments, generator 134 may be an electric generator powered via mechanical energy, air compressor, a hydraulic pump powered via turbine 130, etc.

First flow measurement device 136 and second flow measurement device 138 may be hardware devices configured to measure a flow of fluid through bypass pipeline 120. First flow measurement device 138 may be positioned on first side 122 of bypass pipeline 120, and second flow measurement device 138 may be positioned on second side 124 of bypass pipeline 120. First flow measurement device 136 and second flow measurement device 138 may include transmitters configured to communicate their respective measured fluid flow rate to bypass control valve 116.

First differential pressure measurement device 140 and second differential pressure measurement device 142 may be hardware devices configured to measure pressure across bypass pipeline 120. First differential pressure measurement device 140 may be positioned on first side 122 of bypass pipeline 120, and second differential pressure measurement device 142 may be positioned on second side 124 of bypass pipeline 120. First differential pressure measurement device 140 and second differential pressure measurement device 142 may include transmitters configured to communicate their respective measured flow to bypass control valve 116.

Responsive to bypass control valve 116 receiving the flow measurement from first flow measurement device 136 and second flow measurement device 138 and/or pressure measurements from first differential pressure measurement device 140 and second differential pressure measurement device 142, bypass control valve 116 may open and/or close to modify the flow of fluid through bypass pipeline 120 and effluent pipeline 110. Therefore, bypass control valve 116 may control the flow rate of fluid across turbine 130, such that the differential pressure between first side 122 of bypass pipeline 120 and second side 124 of bypass pipeline 120 remains substantially constant, wherein the substantially constant differential pressure may maximize the rotations per minute of turbine 130.

Figure 2:
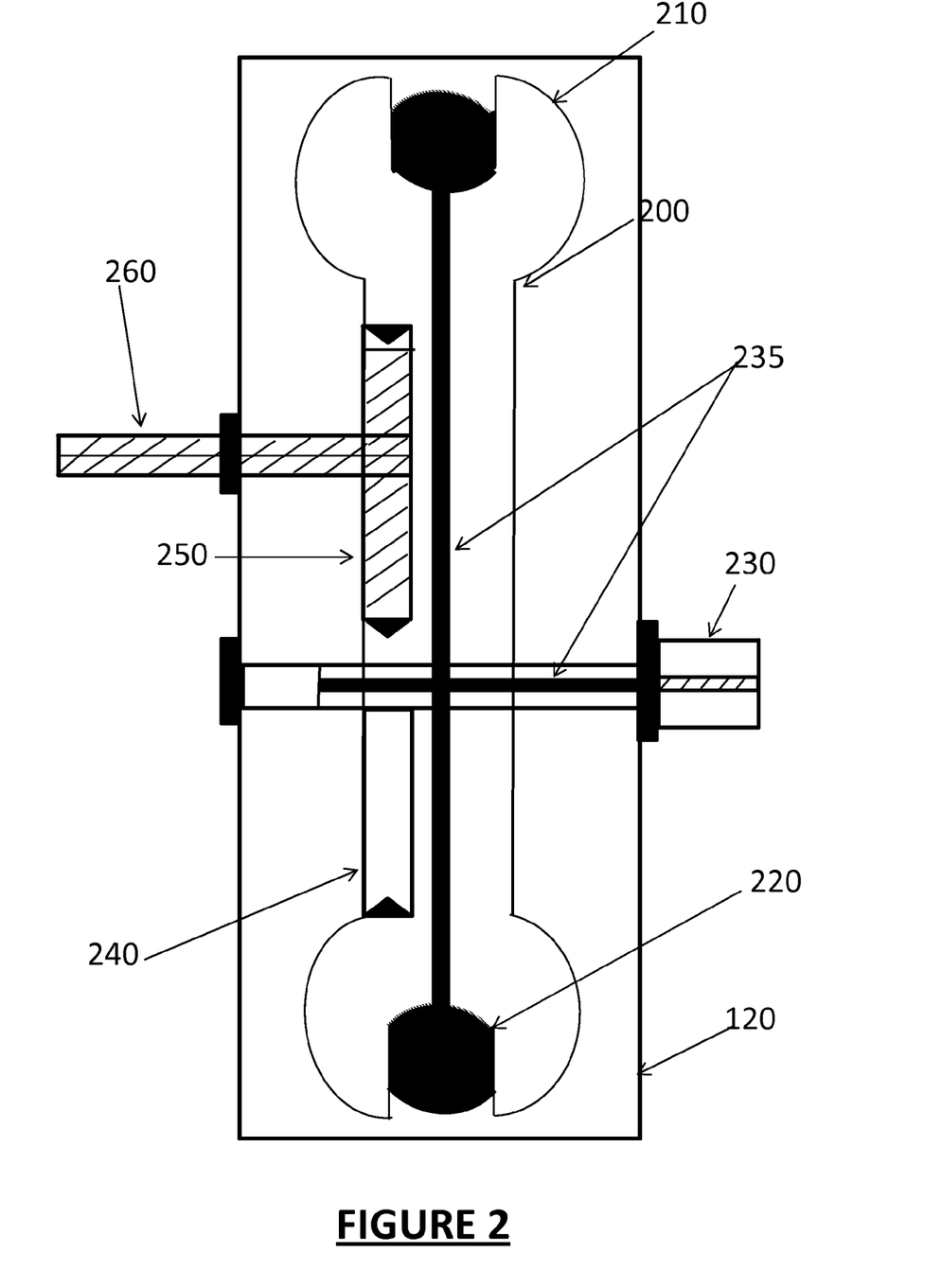
FIG. 2 depicts one embodiment of a front view of a turbine.

FIG. 2 depicts one embodiment of a front view of a turbine 200, wherein turbine 200 may be turbine 130 utilized within effluent to energy system 100. Turbine 200 may be an external, Pelton turbine, wherein at least a portion of turbine 200 is disposed above a fluid level flowing through bypass pipeline 120.

Turbine 200 may include blade 210, waste gate 220, worm drive 230, worm gears 235, ring gear 240, drive gear 250, and drive shaft 260.

Blade 210 may be a device configured to be mounted around the circumference rim of a drive wheel of turbine 200, and be configured to rotate turbine 200. Blade 210 may rotate turbine 200 responsive to fluid contacting blade 210 and/or the pressure differential on a first side of turbine 200 and a second side of turbine 200. Blade 210 may include a first side, which couples blade 210 to the circumference rim of worm drive 230. Blade 210 may extend from the circumference rim of the worm drive 230 towards the perimeter of bypass pipeline 120, wherein a second end of blade 210 may be positioned adjacent to the perimeter of bypass pipeline 120. Furthermore, the second end of blade 210 may be wider than the shaft of blade 210, forming a paddle. The paddle may increase the surface area of the second end of blade 210. Therefore, as fluid flows through bypass pipeline 120, more fluid may contact blade 210, which may increase the torque generated by turbine 200. Although FIG. 2 depicts turbine 200 with two blades, turbine 200 may include more blades 210.

Waste gate 220 may be an orifice, opening, hole, etc. positioned at the second end of blade 210, wherein waste gate 220 may extend from the second end of blade 210 towards an axis of rotation of worm gear 235. While fluid is flowing through bypass pipeline 120, the fluid may flow through blade 210 via waste gate 220. Waste gate 220 may be dynamic, such that it may be raised and/or lowered to control the flow rate of fluid through bypass pipeline 120.

Responsive to waste gate 220 being raised, the surface area of fluid contacting blade 210 may also increase, while the flow rate of fluid through bypass pipeline 120 may decrease. Responsive to waste gate 220 being lowered, the surface area of fluid contacting blade 210 may decrease, while the flow rate of fluid through bypass pipeline 120 may increase. In embodiments, waste gate 220 may be dynamically lowered or raised by a bypass control valve based on the pressure differential between the pressure on a first side of turbine 200 and a second side of turbine 200 to optimize the rotational speed of turbine 200.

Worm drive 230 may be coupled to a worm drive motor, and be configured to raise and lower waste gate 220. Worm drive 230 may extend across bypass pipeline 120, and through turbine 200, wherein worm drive 230 may provide an axis of rotation from blades 210. In embodiments, the worm drive motor may be configured to align with worm drive 230. Responsive to the worm drive motor rotating worm drive 230, worm gears 235 may rotate to raise and/or lower waste gate 220. Worm drive 230 may be configured to raise and/or lower waste gate 220 responsive to receiving data from a bypass control valve, wherein waste gate 220 may be raised and/or lowered to control the flow rate of fluid through bypass pipeline 120 and/or control the pressure differential between a first side of turbine 200 and a second side of turbine 200.

Ring gear 240 may be a ring with teeth positioned adjacent to a second end of blade 210. Accordingly, ring gear 240 may be positioned off-center from the center of a rotation of axis of turbine 200, such that ring gear 240 may utilize the extended diameter of blade 210 to optimize the horsepower, rotations per minute, and torque generated by turbine 200. Ring gear 240 may be configured to interface with drive gear 250 to rotate drive shaft 260. Drive gear 250 may be mounted in the turbine housing with teeth configured to align with teeth of ring gear 240. Drive gear 250 may be sized to optimize horse power and rotations per minute transferred to drive shaft 260.

Drive shaft 260 may be configured to transmit torque and rotation energy generated by turbine 200 to a generator. Drive shaft 260 may be coupled with ring gear 240 via drive gear 250. In embodiments, drive shaft 260 may be positioned off-center from an axis of rotation of turbine 200 and perpendicular to blade 210 to maximize the torque transferred from turbine 200 to drive shaft 260.

Figure 3:
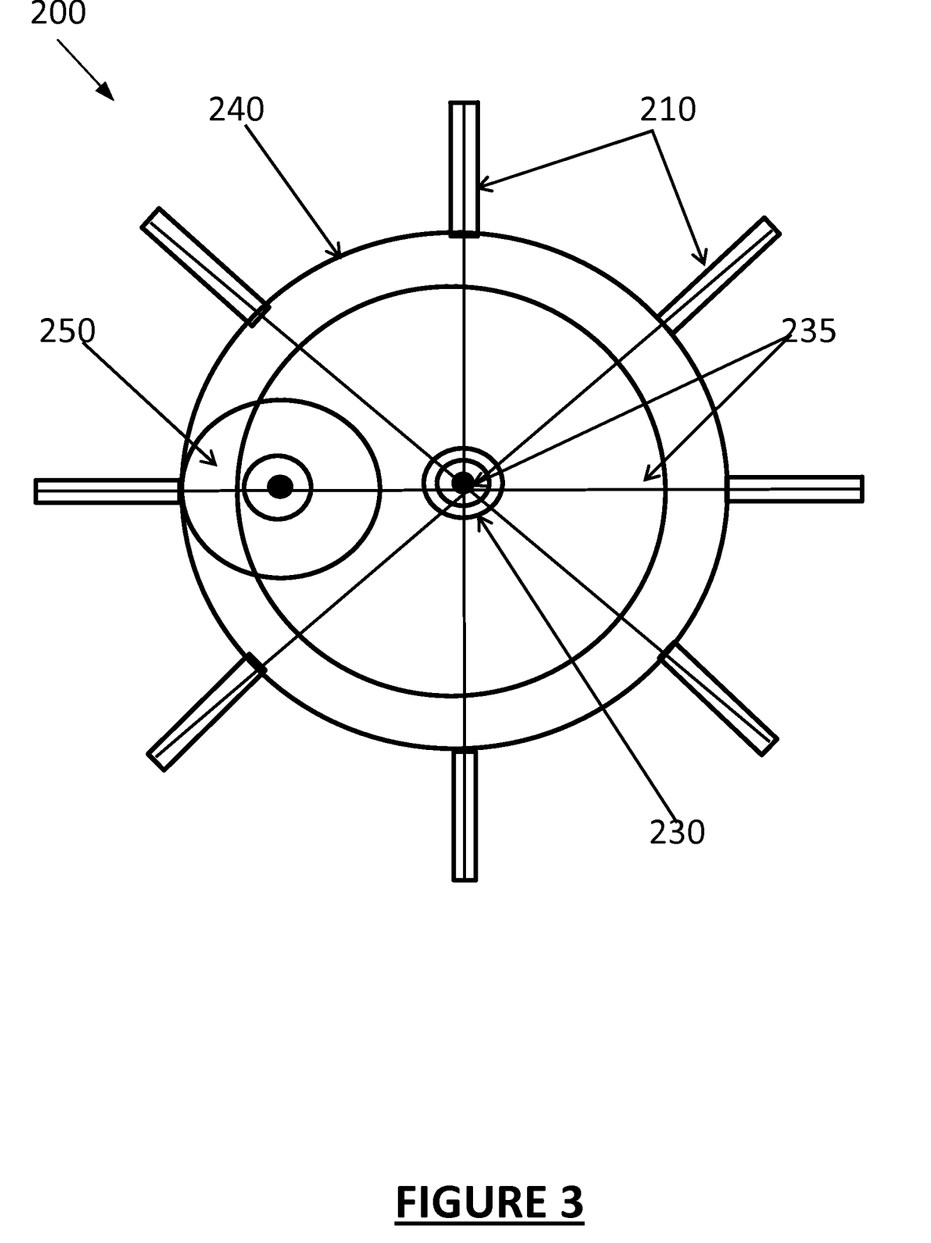
FIG. 3 depicts one embodiment of a side view of a turbine.

FIG. 3 depicts one embodiment of a side view of a turbine 200. As depicted in FIG. 3, worm drive 230 may be coupled to blade 210 to rise and/or lower waste gate positioned within blade 210.

Furthermore, as depicted in FIG. 3, ring gear 240 may be positioned adjacent to the second end of blade 210, such that ring gear 240 may be positioned to maximize the torque generated by turbine 200. Drive shaft 260 and drive gear 250 may have an axis of rotation that is off-center with respect to the axis of rotation of turbine 200, which may maximize the amount of torque transferred from turbine 200 to drive shaft 260 via drive gear 250. Drive gear 250 may be configured to interface with ring gear 240 to rotate drive shaft 260 to power a generator.

Figure 4:
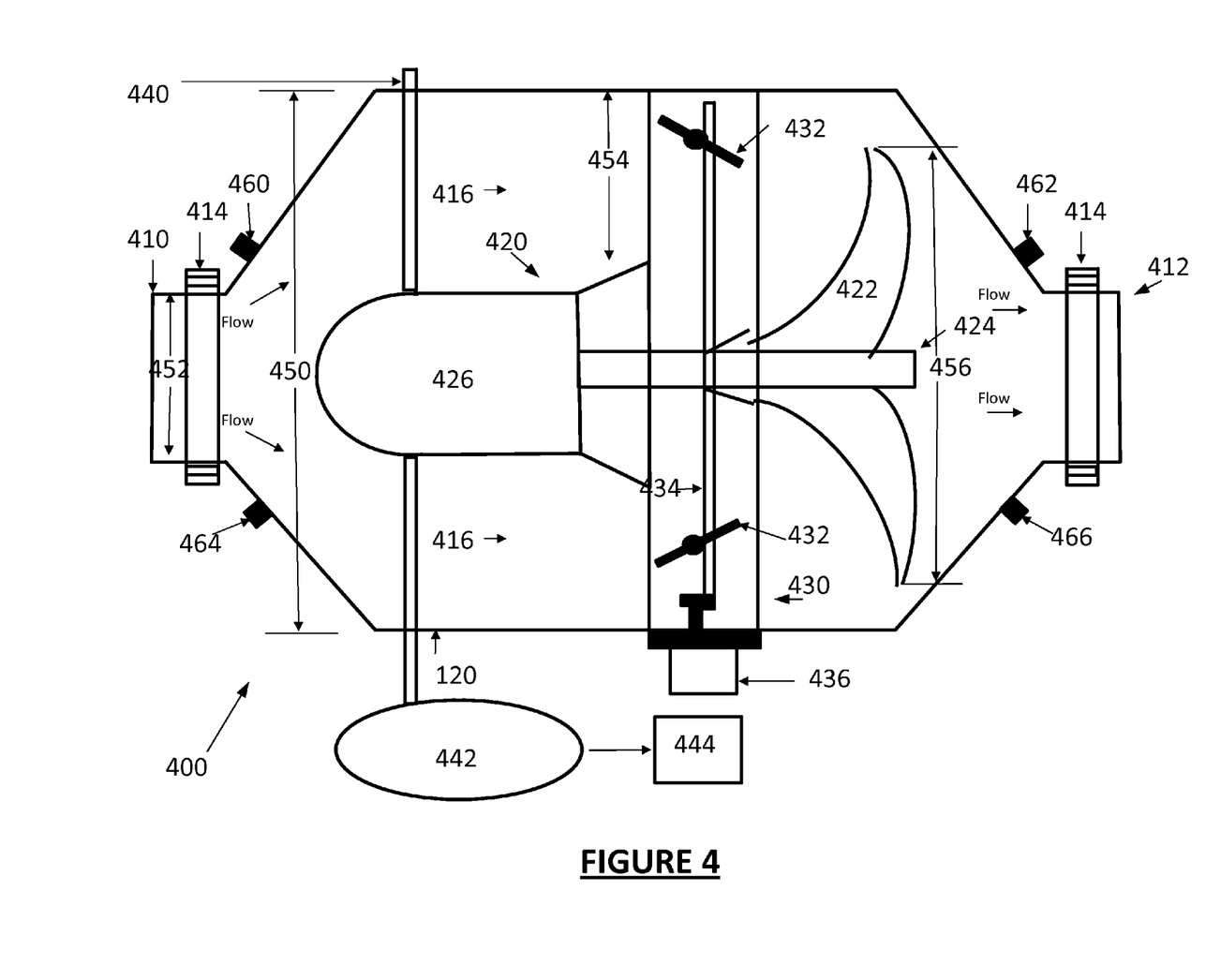
FIG. 4 depicts one embodiment of a top view of an internal turbine system

FIG. 4 depicts one embodiment of a top view of an internal turbine system 400, wherein internal turbine system 400 may be turbine 130 utilized within effluent to energy system 100. Internal turbine system 400 may be configured to maximize the energy output from existing effluent pipelines where head pressures and flow rates are minimal. Internal turbine system 400 may be configured to be coupled to bypass pipeline 120, and internal turbine system 400 may be submersed in the flow of fluid through bypass pipeline 120. In embodiments, the distance from a first side wall of internal turbine system 400 to a second side wall of internal turbine system 400 may be a first diameter 450. The first diameter 450 may be a distance that allows no flow disruption, such that internal turbine system 400 is continuously full of fluid to ensure optimum operational efficiency.

Internal turbine system 400 may include inlet port 410, outlet port 412, turbine 420, flow control system 430, air snorkel system 440, first flow measurement device 460, second flow measurement device 462, first differential pressure measurement device 464, and second differential pressure measurement device 466.

Inlet port 410 may be positioned on a first side of internal turbine system 400, wherein inlet port 410 may be configured to receive fluid flowing through bypass pipeline 120. Inlet port 410 may be coupled to bypass pipeline via flanges 414. Inlet port 410 may have an opening of a second diameter 452.

Outlet port 412 may be positioned on a second side of internal turbine system 400, wherein outlet port 412 may be configured to dispense fluid into bypass pipeline 120. Outlet port 412 may be coupled to bypass pipeline 120 via flanges 414. The flow of fluid 416 may be configured to move from inlet port 410 to outlet port 412.

Turbine 420 may be an internal turbine configured to be submerged in the flow of fluid 416. Turbine 420 may be configured to generate energy responsive to the flow of fluid 416 and/or the pressure differential between the first side of internal turbine system 400 and the second side of internal turbine system 400.

Turbine 420 may include blades 422, shaft 424, and generator 426. In embodiments, the distance 454 between a first sidewall of internal turbine system 400 and turbine 420 may be equal to second diameter 452, and the distance 454 between a second sidewall of internal turbine system 400 and turbine 420 may also be equal to the second diameter 452. By limiting the internal diameter 450 of internal turbine system 400 respective to the second diameter 452 there may be no flow of fluid 416 disruption through internal turbine system 400, while also maintaining internal turbine system 400 full of fluid.

Blades 422 may be impellers, projections, paddles, etc. configured to rotate around shaft 424. Blades 422 may be configured to rotate responsive to being in contact with the flow of fluid 416 through internal turbine system 400 and/or the pressure differential between the first side of internal turbine system 400 and the second side of internal turbine system 400. As the flow of fluid 416 through internal turbine system 400 increases, the rotations per minute of blades 422 may also increase. In embodiments, the length of blades 422 may be a fourth diameter 456. The fourth diameter 456 may be sized to be larger than the second diameter 452 and also effluent pipeline 110. For example, the fourth diameter 456 may be may be three to ten times larger than the diameter of effluent pipeline and/or second diameter 452.

Shaft 424 may be a device configured to move, rotate, etc. responsive to blades 422 being rotated. Shaft 424 may mechanically couple blades 422 with generator 426. Shaft 424 may be configured to transmit torque generated by blades 422 to generator 426.

Generator 426 may be a device configured to convert mechanical energy into electrical energy. Generator 426 may be configured to receive mechanical energy in the form of torque from shaft 424, and convert the torque into electrical energy. In embodiments, generator 426 may be cooled by the flow of fluid 416 through internal turbine system 400, and generator 426 may be a fluid tight system that is pressured to maximize the cooling effect of the flow of fluid 416, allowing for more efficient energy production. One skilled in the art will appreciate that generator 426 may be an electric generator powered via mechanical energy, air compressor, a hydraulic pump, etc. In embodiments, when generator 426 is air compressor, the compressed air generated by generator 426 may be a conduit allowing the compressed air to be stored in air storage unit 442, wherein air storage unit 442 may be located remotely from bypass pipeline 120. The compressed air within storage unit 442 may be configured to power an air motor 444.

Flow control system 430 may be configured to control the flow of fluid 416 through internal turbine system 400. Specifically, flow control system 430 may be configured to control the angle of the flow of fluid 416 contacting blades 422 to maximize the rotational speed of blades 422. In embodiments, responsive to the flow rate of the flow of fluid 416 and/or pressure differential between the first side of internal turbine system 400 and the second side of internal turbine system 400, flow control system 430 may change the angle of the flow of fluid 416 contacting blades 422 to have a consistent and optimized rotational speed. Flow control system 430 may include louvers 432, gear ring 434, and motor 436.

Louvers 432 may be projections, partitions, etc. configured to direct the angle of flow of fluid 416 contacting blades 422. Louvers 432 may be configured to be rotated to open and close via ring gear 434. Ring gear 434 may have a length that extends past a second end of blades 422. In embodiments, motor 436 may be a motor configured to move ring gear 434. Louvers 432 may be rotated between a direction perpendicular to shaft 424 and a direction parallel to shaft 424 to change the angle that the flow of fluid 416 contacts blades 422, wherein the angle at which the flow of fluid 416 contacts blades 422 may alter the rotational speed of blades 422. In embodiments, each louver 432 may be configured to be rotated independently from other louvers 432, or louvers 432 may be configured to be rotated in unison.

First flow measurement device 460 and second flow measurement device 462 may be hardware devices configured to measure the flow of fluid 416 through internal turbine system 400. First flow measurement device 460 may be positioned on first side of internal turbine system 400 between flow control system 430 and inlet port 410. Second flow measurement device 462 may be positioned on a second side of internal turbine system 400 between flow control system 430 and outlet port 412.

First differential pressure measurement device 464 and second differential pressure measurement device 466 may be hardware devices configured to measure pressure. First differential pressure measurement device 464 may be positioned on first side of internal turbine system 400 between flow control system 430 and inlet port 410. Second differential pressure measurement device 466 may be positioned on a second side of internal turbine system 400 between flow control system 430 and outlet port 412.

Figure 5:
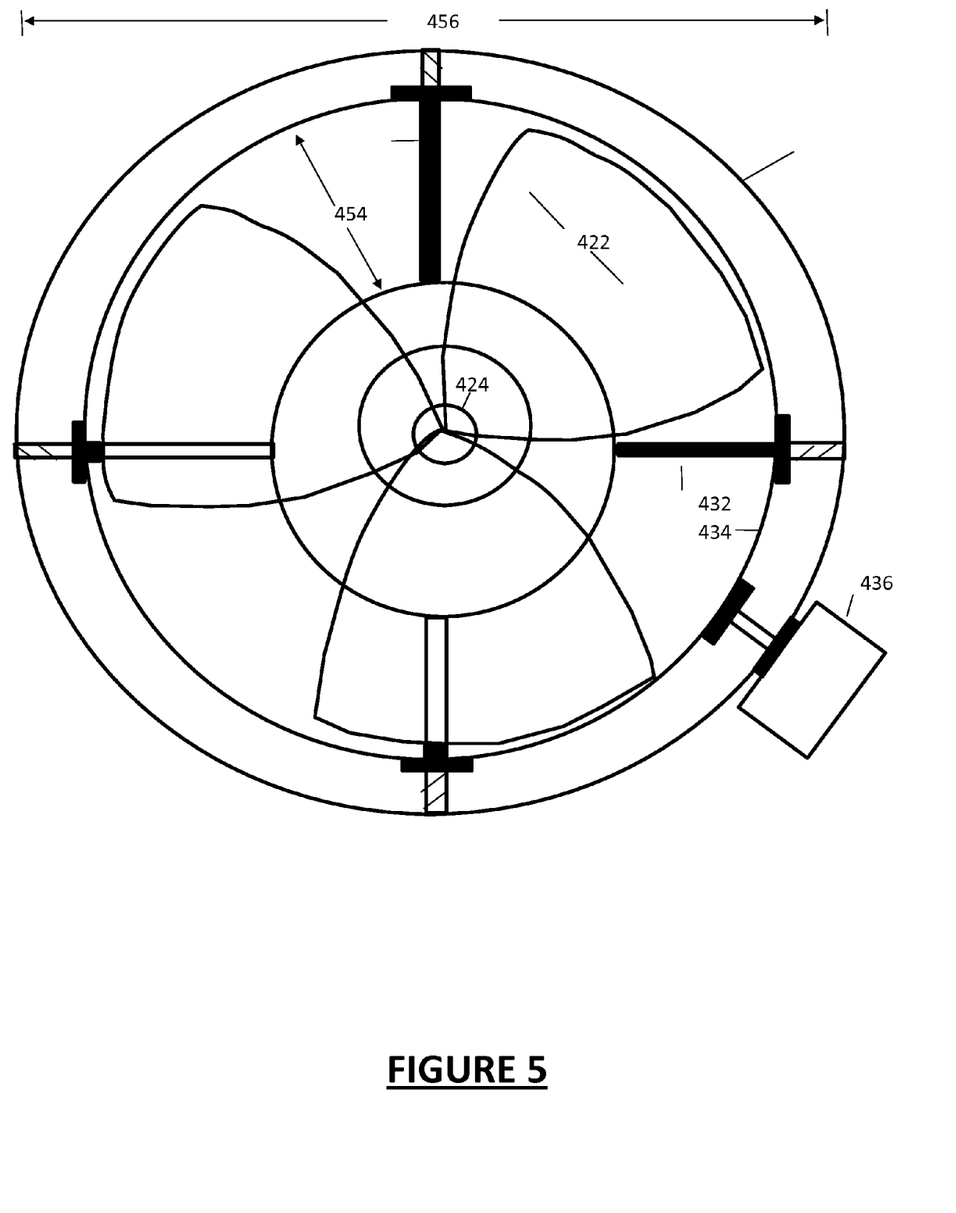
FIG. 5 depicts a front view of internal turbine system.

FIG. 5 depicts a front view of internal turbine system 400. As depicted in FIG. 5, the distance between a boundary of gear ring 434 and turbine 420 may be the third diameter 454, which may also be equal to the diameter of inlet port 410. Furthermore as depicted in FIG. 5, turbine 420 may include a plurality of blades 422, wherein turbine 420 may include a number of blades 422 that maximizes the torque and rotational speed of blades 422.

Figure 6:
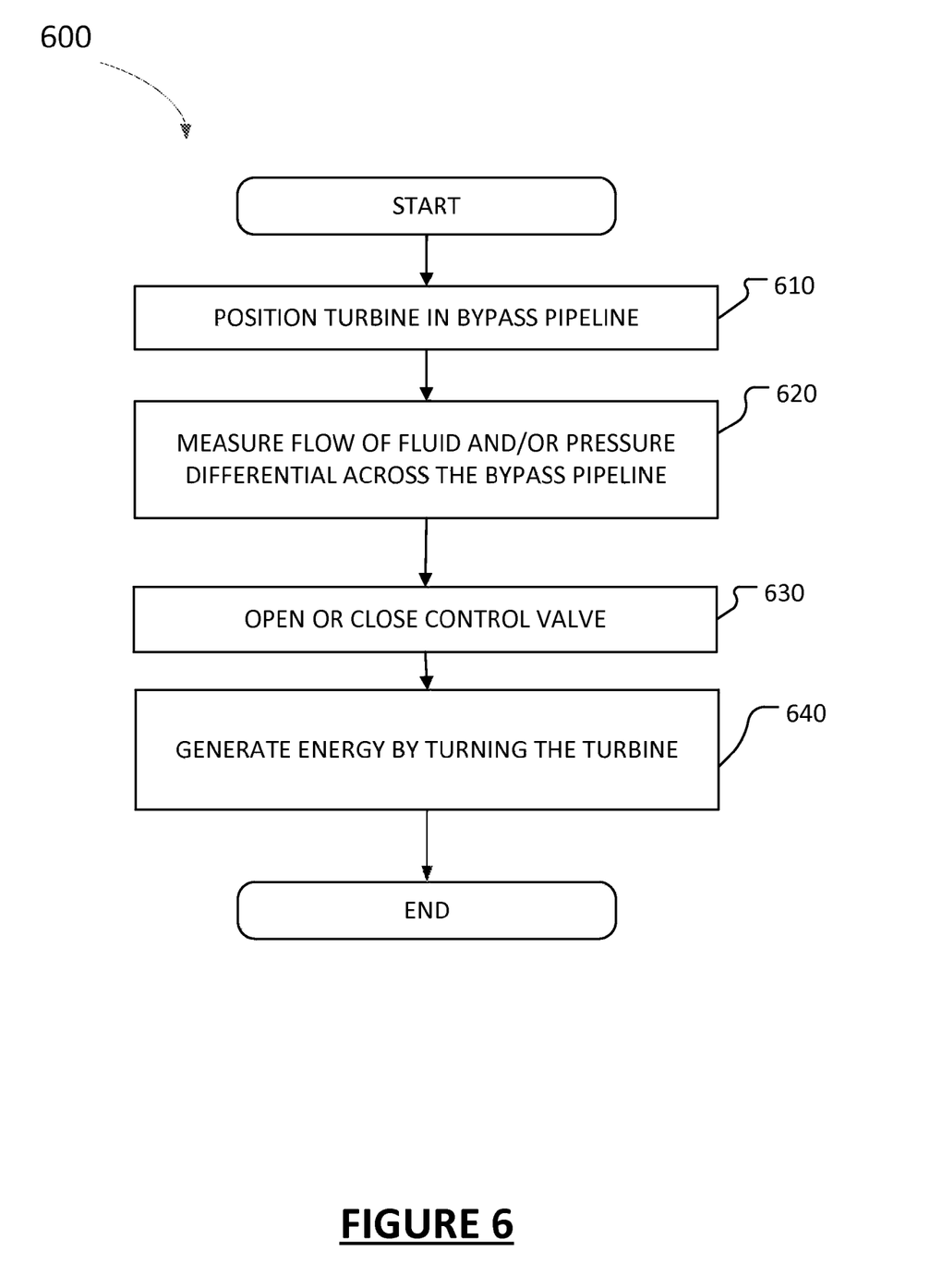
FIG. 6 depicts a method 600 for producing energy via an effluent to energy system.

FIG. 6 depicts a method 600 for producing energy via an effluent to energy system. The operations of method 600 presented below are intended to be illustrative. In some embodiments, method 600 may be accomplished with one or more additional operations not described, and/or without one or more of the operations discussed. Additionally, the order in which the operations of method 600 are illustrated in FIG. 6 and described below is not intended to be limiting.

At operation 610, a turbine may be positioned within a bypass pipeline. The bypass pipeline may be a second, divergent pipeline that couples to an effluent pipeline at a first point and a second point. The blades of the turbine may have a diameter that is greater than the length of an effluent pipeline.

At operation 620, the flow of fluid and/or pressure differential across a bypass pipeline may be determined. The flow of fluid and/or pressure differential may be determined by flow measuring devices or pressure sensors positioned on different sides of the bypass pipeline. A first side of the bypass pipeline receives fluid from an effluent pipeline, and a second side of the bypass pipeline outlets the fluid into the effluent pipeline.

At operation 630, responsive to measuring the flow of fluid and/or the pressure across the bypass pipeline, a control valve may open or close to modify the flow of fluid through the bypass pipeline and the effluent pipeline.

At operation 640, the turbine positioned within the bypass pipeline may turn to generate energy. The turbine may generate energy by turning based on the flow of fluid and/or the pressure differential across the bypass pipeline. For example, by opening the control valve more fluid may flow through the bypass pipeline than when the control valve is opened. This may cause the turbine to turn more quickly to produce more energy.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

What is claimed is:

1. An effluent to energy system comprising:
    an effluent pipeline configured to transport fluid, the effluent pipeline having a first diameter;
    a bypass pipeline having a first end and a second end, the first end being an inlet configured to receive the fluid from the effluent pipeline, the second end being an outlet configured to outlet the fluid into the effluent pipeline, the bypass pipeline having a second diameter, wherein the second diameter is greater than the first diameter;
    a turbine positioned within the bypass pipeline, the turbine being configured to turn to generate energy, the turbine including a blade having a third diameter, the third diameter being greater than the first diameter and less than the second diameter; and
    a control valve positioned at a divergent point between the bypass pipeline and the effluent pipeline, the control valve being configured to control a flow of fluid through the bypass pipeline to dynamically change a rate of rotation of the turbine.

2. The effluent to energy system of claim 1, wherein when the effluent to energy system has a surplus of the fluid, the fluid is transported through both the effluent pipeline and the bypass pipeline.

3. The effluent to energy system of claim 1, wherein when the effluent to energy system has a limited supply of fluid, the fluid is transported through only the bypass pipeline and the fluid is not transported through the effluent pipeline.

4. The effluent to energy system of claim 1, including:
    a plurality of blades coupled to the turbine; and
    a waste gate coupled to at least one of the blades, the waste gate being configured to be raised to decrease a surface area of the blade or lowered to decreased the surface area of the blade.

5. The effluent to energy system of claim 4, wherein when the waste gates are lowered the flow of fluid through the bypass pipeline increases, and when the waste gates are raised the flow of fluid through the bypass pipeline decreases and the rate of rotation of the turbine increases.

6. The effluent to energy system of claim 4, including:
    louvers configured to direct an angle of the flow of fluid contacting the plurality of blades.

7. The effluent to energy system of claim 1, wherein the turbine is configured to be submersed in the flow of fluid through bypass pipeline.

8. The effluent to energy system of claim 1, wherein the turbine is configured to be rotated based on a pressure differential across the bypass pipeline.

9. The effluent to energy system of claim 1, wherein the turbine is configured to be rotated based on the flow of fluid across the bypass pipeline.

10. The effluent to energy system of claim 1, including:
    a drive shaft configured to transmit torque generated by the turbine to a generator, the drive shaft being positioned off-center from an axis of rotation of the turbine and perpendicular to the blade of the turbine.

11. A method of generating energy comprising:
    transporting fluid through an effluent pipeline having a first diameter;
    receiving the fluid at a first end of a bypass pipeline from the effluent pipeline;
    outputting the fluid into the effluent pipeline from a second end of the bypass pipeline, the bypass pipeline having a second diameter, wherein the second diameter is greater than the first diameter;
    positioning a turbine within the bypass pipeline;
    generating energy by rotating the turbine, the turbine including blades having a third diameter, the third diameter being greater than the first diameter and less than the second diameter; and
    controlling a flow of fluid through the bypass pipeline to dynamically change a rate of rotation of the turbine.

12. The method of claim 11, including:
    transporting the fluid through both the effluent pipeline and the bypass pipeline when there is a surplus of fluid.

13. The method of claim 11, including:
    transporting the fluid through only the bypass pipeline and not through the effluent pipeline when there is a limited supply of the fluid.

14. The method of claim 11, including:
    coupling a plurality of blades to the turbine; and
    raising and lowering a waste gate coupled to at least one of the blades, the waste gate being raised to decrease a surface area of the blade or lowered to decreased the surface area of the blade.

15. The method of claim 14, including:
    lowering the waste gate to increase the flow of fluid through the bypass pipeline increases; and
    raising the waste gate to decrease the flow of fluid through the bypass pipeline decreases and increase the rate of rotation of the turbine.

16. The method of claim 14, including:
    positioning louvers to direct an angle of the flow of fluid contacting the plurality of blades.

17. The method of claim 11, including:
    submersing the turbine in the flow of fluid through bypass pipeline.

18. The method of claim 11, wherein the turbine is configured to be rotated based on a pressure differential across the bypass pipeline.

19. The method of claim 11, wherein the turbine is configured to be rotated based on the flow of fluid across the bypass pipeline.

20. The method of claim 11, including:
    transmitting torque via a drive shaft coupled to the turbine when the turbine is rotated, the drive shaft being positioned off-center from an axis of rotation of the turbine and perpendicular to the blade of the turbine.

* * * * *